(No Model.)

H. McDANIEL.
SEEDER AND PLANTER.

No. 459,762. Patented Sept. 22, 1891.

WITNESSES:
A. E. Glascock,
M. E. Lansdale.

INVENTOR
Hardy McDaniel,
BY
John S. Duffie
ATTORNEY.

UNITED STATES PATENT OFFICE.

HARDY McDANIEL, OF DONALDSON, ARKANSAS.

SEEDER AND PLANTER.

SPECIFICATION forming part of Letters Patent No. 459,762, dated September 22, 1891.

Application filed November 24, 1890. Serial No. 372,474. (No model.)

*To all whom it may concern:*

Be it known that I, HARDY MCDANIEL, a citizen of the United States, residing at Donaldson, in the county of Hot Springs and State of Arkansas, have invented certain new and useful Improvements in Seeders and Planters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has relation to planters; and it consists in the novel construction and arrangement of its parts.

Figure 1:
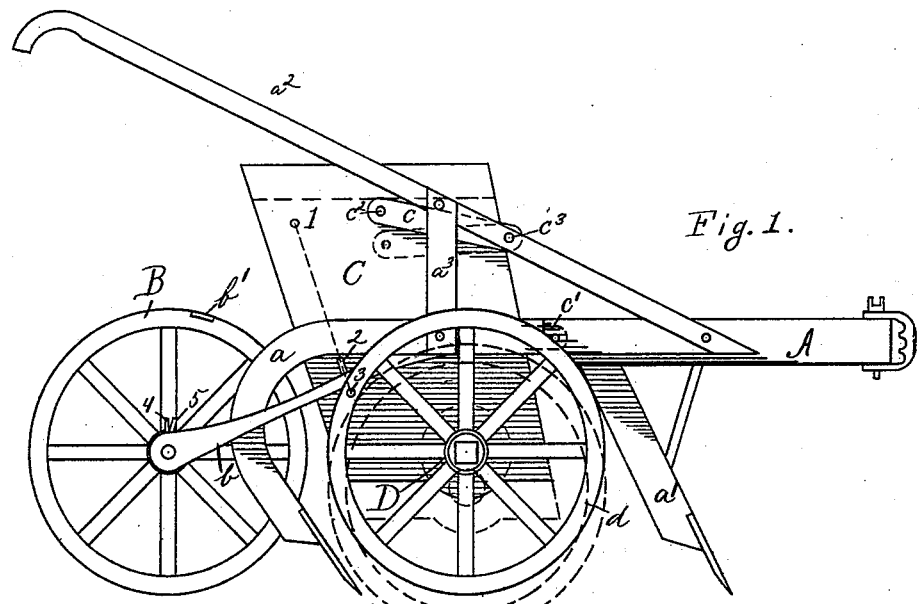
Figure 2:
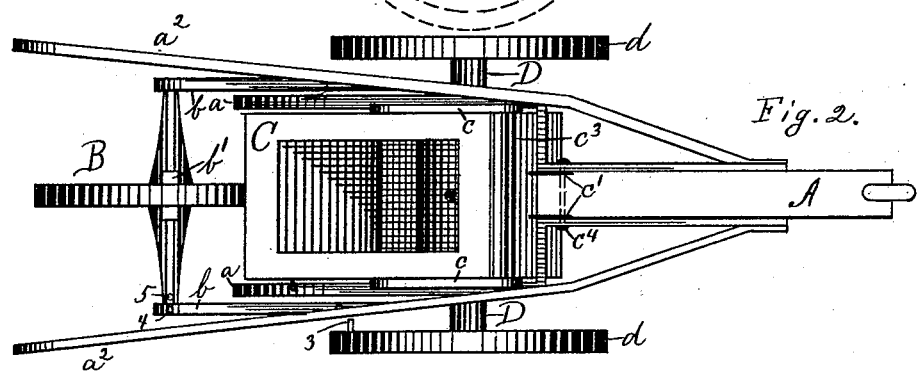
Figure 3:
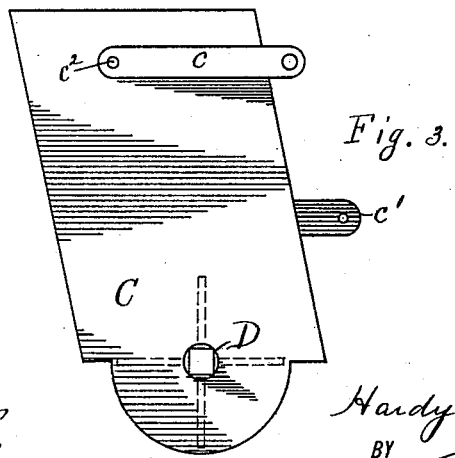

In the accompanying drawings, Figure 1 is a side elevation of my invention. Fig. 2 is a top elevation of Fig. 1, and Fig. 3 is a detail view of the hopper.

My invention is described as follows: It consists of the beam A, rear standards $a$, front standards $a'$, handles $a^2$, and braces $a^3$, all secured in place by proper bolts and nuts.

Between a pair of spring-arms $b$, secured to the rear standards $a$, is journaled a track-wheel B, the tire of which is provided with a marker $b'$.

A hopper C has the arms $c$ and $c'$. Said arms $c$ have one end pivoted to said hopper at $c^2$ and the other end pivoted on the round $c^3$, and arms $c'$ have one end rigidly secured to the front side of said hopper and the other end pivoted on a bolt $c^4$, passing through the beam A. Said hopper has passing through it near its bottom an axle D, to the ends of which is secured a pair of bearing-wheels $d$. Said axle is provided either with an ordinary cylindrical feed-shaft, as shown in Figs. 1 and 2, or with the ordinary agitator-arms and cut-off slides.

My invention is further provided with the point 1, attached to the side of hopper A, point 2 on the upper side of the spring-arm $b$, near its middle, point 3 on the felly of wheel $d$, point 4 on the free end of said arm $b$, immediately over the axle of the track-wheel B, and point 5 on the axle of said track-wheel.

The operation of my invention is described as follows: If it is desired to plant the seed in hills, the hopper and feed-wheel, with the cut-off, is used, and the points 1, 2, and 3 are arranged in a straight line (see Fig. 1) and the points 4 and 5 are arranged parallel to each other. Point 5 points always to the marker $b'$. As the planter moves along, the shovel on the standard $a$ makes a furrow, and the feed-wheel drops a seed into said furrow. Then the rear shovels cover the seed and the marker on the track-wheel B stamps on the ground immediately over the seed. Thus the operator is able to plant the seed so that it is in rows each way, and hence admits of cultivation each way. When the seed is to be drilled, the hopper, with the agitator, as shown in Fig. 3, is used. In this case it will be unnecessary to adjust the points. The operation of the planter is the same as above described. As the planter passes over rough or cloddy ground, the hopper C, pivoted at $c^3$ and $c^4$, will allow both of the wheels $d$ to be on the ground at the same time, and the hopper so attached is continually jolting and keeps the seed from banking.

Having described my invention, what I claim as new, and desire to secure by Letters Patent, is—

1. In a seed-planter having the beam A, standards $a$ and $a'$, handles $a^2$, and braces $a^4$, spring-arms $b$, having one end secured to the rear standard $a$, track-wheel B, having the marker $b'$, hopper C, having the arms $c$ and $c'$, and axle D, journaled in its bottom, and wheels $d$, and points 1, 2, 3, 4, and 5, all substantially as shown and described, and for the purposes set forth.

2. In a planter, substantially as shown and described, the combination of the frame provided with suitable plow-standards and handles, side arms having pivoted between their rear ends the track-wheel, a hopper swung on pivoted arms, so that it may move up and down, and having secured on the ends of its axle side wheels, points 1, 2, and 3, points 4 5, and marker $b'$, all substantially as shown and described, and for the purposes set forth.

In testimony whereof I affix my signature in presence of two witnesses.

HARDY McDANIEL.

Witnesses:
WARREN RAINWATERS,
W. C. RAINWATERS.